May 8, 1962 H. J. THIELSCH 3,033,145
INSERT WELDING RINGS

Original Filed Dec. 3, 1954 3 Sheets-Sheet 1

INVENTOR.
HELMUT J. THIELSCH
BY David D. McKenney
ATTORNEY

May 8, 1962 H. J. THIELSCH 3,033,145
INSERT WELDING RINGS
Original Filed Dec. 3, 1954 3 Sheets-Sheet 2

INVENTOR.
HELMUT J. THIELSCH
BY David D. McKenney
ATTORNEY

May 8, 1962  H. J. THIELSCH  3,033,145
INSERT WELDING RINGS

Original Filed Dec. 3, 1954  3 Sheets-Sheet 3

INVENTOR.
HELMUT J. THIELSCH
BY David D. McKenney
ATTORNEY

United States Patent Office 3,033,145
Patented May 8, 1962

3,033,145
INSERT WELDING RINGS
Helmut J. Thielsch, Cranston, R.I., assignor to Grinnell Corporation, Providence, R.I., a corporation of Delaware
Continuation of application Ser. No. 472,911, Dec. 3, 1954. This application Feb. 24, 1959, Ser. No. 794,674
4 Claims. (Cl. 113—136)

The invention relates generally to improvements in welding and more particularly has to do with solid consumable insert welding rings to facilitate butt welding of piping and tubing.

In recent years piping used in the steam generation of power and in many chemical processes has been required to withstand increasingly higher temperatures and pressures and has been exposed to increasingly corrosive conditions. This trend has in many instances necessitated the use of stainless steel piping capable of withstanding these severe temperature, pressure and corrosive conditions. As an example, one grade of steel which is now being widely used in power and chemical process piping is the columbium-stabilized austenitic stainless steel known as type 347 grade. Other examples of piping material now being employed for severe service conditions are other stainless steel types, chrome-moly alloy steel and non-ferrous materials such as copper, nickel, Monel and aluminum.

Piping or tubing of these materials having a wall thickness greater than one-eighth of an inch cannot have its sections satisfactorily joined together by welding in a single pass welding operation. Thus, if two sections of such heavy walled piping or tubing have their adjacent ends cut so as to fit close together throughout the entire pipe wall cross-section, the application of heat to the outside surface of the pipe at the joint to achieve a welding thereof would not provide sufficient penetration of fusion of the metal in the two sections to achieve a weld from the outside to the inside diameters of the piping. The fusion which is achieved has a cross-sectional area smaller than the total cross-sectional area of the pipe wall at the joint.

Accordingly, it has become the practice in welding together sections of heavy wall pipe, and in welding of such pipe sections to other equipment, to machine the adjacent ends which are to be joined by cutting away some pipe material a short distance back from the end of the section and part way in from the outside surface thereof, so that when the sections are brought together in contact with each other a substantial groove is formed which extends into the wall and has its bottom defined by the abutment together of the two lips or "roots" resulting from the removal of material as described. The root ends or faces, as they are called, which are abutted together are likewise machined flat so that they may make close engagement with each other when brought together or provide a uniform gap when spaced slightly apart. In some welding processes a small gap of $\frac{1}{16}$ inch or less is desirable to compensate for the expansion resulting from the heat of the welding operation.

After this initial preparation of the pipe section ends by machining these ends may be welded together in two or more operations to achieve a finished weld across the whole wall thickness of the pipe. In the initial welding pass heat is applied to the roots abutted together at the bottom of the groove. Since the engaging root faces are substantially less thick than the pipe wall itself complete fusion of the metal in these roots is achieved across the entire root faces. This initial welding operation is known in the art as welding the "root pass." In subsequent operations the groove is filled with weld metal supplied by electrodes or welding rods of suitable composition.

In recent years as the temperatures and pressures in power piping have increased and as the process piping in the chemical and refinery industries have been called upon to handle increasingly corrosive fluids at high temperatures and pressures, a serious problem has arisen from failures in these welds, often taking the form of an initial notch in the root pass, such as results from incomplete penetration or microcracking in the root of the weld, propagates into a growing crack by mechanical or thermal fatigue, by shock and by corrosion—the last being known as stress corrosion. Furthermore, it has been determined that the austenitic stainless steels are particularly weak in the grain boundaries between 2000° F. and 1600° F., and as the fused root material passes through this range during cooling of the weld the stresses due to shrinking tend to produce microcracking failures at these grain boundaries. Because this microcracking of austenitic stainless steels takes place at elevated temperatures it is commonly referred to as "hot cracking."

It has been found that to some extent this undesirable microcracking can be avoided by improved design of the machined groove and of the root formed thereby, by removing all oxygen from the neighborhood of the joint during the application of heat in the welding operation, as for example by surrounding the joint with an inert gas, a technique known in the art as "purging," and by inserting into the interior of the pipe backing rings which fit closely to the inside pipe wall at the joint and to some extent may control the cooling rate of the fused material being welded. However, despite the efforts which have been made to solve the problem of microcracking by these devices, the problem remained substantially unsolved until it was discovered that the insertion of a quantity of material between the root faces was advantageous.

To accomplish this insertion of a welding material between the root faces prior to the welding of the root pass it has heretofore been attempted to bend a piece of specially shaped wire to the curvature of the root pass face and then tack-weld this piece of wire thereto. However, the proper bending of this wire into shape without twisting it and the necessary tack-welding of the wire to the root face at numerous places therearound has been found to be a delicate and difficult operation requiring a great deal of fit-up time and considerable skill. Furthermore, although the use of such wire has to some extent reduced the problem of microcracking in the root pass, the tack-welding of this wire to the root faces has itself been found to be the cause of microcracking in the areas tack-welded, this being particularly noticeable in certain types of stainless steels such as the type 347 earlier referred to.

The present invention makes possible the enjoyment of the benefits resulting from the insertion of welding material between the root faces, without the disadvantages of extensive fit-up time or microcracking due to tack-welding which have hitherto attended the use of the insert wire, by providing a solid preformed consumable ring of selected material which may be inserted very quickly between the root faces without being bent to fit therearound and which may be held in place without tack-welding. Each ring is preformed to fit properly between the root faces of the pipe size with which it is intended to be used without any modification of its shape and has its sides adapted to lie against the root faces in substantially continuous contact therewith. Preferably the rings have an inside-to-outside diameter width somewhat in excess of the inside-to-outside diameter width of the root faces, thereby supplying at the weld sufficient additional fusable material to compensate for that shrinkage during cooling. Such shrinkage reduces the cross-sectional area of the fused material and where the fusable material at the joint (roots themselves and insert) is no wider than the root faces the shrinkage stresses may exceed the fused material strength and result in microcracking.

In the case where the piping sections to be welded together are so positioned in space that the root faces lie in planes which are horizontal or substantially so, and where no gap is required at the joint the improved solid insert ring of this invention may be located between the root faces by merely placing it on the lowermost of these faces and bringing the uppermost root face into contact with it. Normally the weight of the uppermost pipe section in this arrangement will serve to hold the improved solid insert ring firmly in place during the welding of the root pass.

Where more positive fixing of the improved insert ring in position is desired small projections extending from the sides of the ring to lie against the exterior or interior, or both the exterior and interior, surfaces of the root or a continuous flange or flanges on the ring and so extending, may be employed.

In cases where the pipe sections to be welded together are so disposed that the root faces lie in vertical planes (as in the case where the pipe sections are horizontal) or lie in planes tilted substantially from the horizontal, it is within the scope of this invention to so provide these projections or flanges that they overlie and rest upon the exterior root surface at the uppermost side of the pipe sections and overlie and rest upon the interior root surface at the lowermost side of the pipe sections. By this arrangement the ring has its weight supported on the roots in its proper position. In practice where such supporting of the ring is required, the ring is merely "hung" on one of the roots while the pipe sections are separated sufficiently to allow insertion of the ring between the root faces and the sections are then brought together until the root faces make firm contact with the ring sides.

In this last described disposition of the pipe sections to be welded, that is, where the root faces lie either in perpendicular planes or in planes tilted substantially from the horizontal, there is a tendency for fused metal in that portion of the root pass which is uppermost on the pipe to "sag" and extend downward an appreciable distance into the interior of the pipe before it cools and solidifies and a similar tendency for the fused metal in that portion of the root pass which is lowermost on the pipe to sag downward away from the interior of the pipe before it solidifies and leave a cavity in the joint at this location. With the improved solid insert ring of the present invention this weld metal "sag" can be very accurately compensated for by so locating the supporting projections or flanges that when the insert ring is located in place it is disposed eccentrically with respect to the root faces. Since the ring is circular this eccentricity automatically locates the insert welding material the proper distance above the position to which it will sag before solidifying at each point around the root pass.

One object of the present invention is to provide an improved form of consumable solid welding ring material for insertion between the root faces preparatory to the root pass welding of pipe section in piping and tubing systems.

Another object is to provide a consumable solid welding insert ring for the purpose described which is preformed to fit properly over the root faces of the particular joint to be welded.

Another object is to provide a consumable solid welding insert ring which contains enough material to compensate for shrinkage of the fused root material during cooling and to compensate for improper alignment of the pipe sections and improper abutting of the root faces against the insert material during the fit-up of the pipe sections preparatory to welding.

Another object is to provide a consumable solid insert welding ring as described which is properly located and held in place against the root faces without having to be rigidly secured to these faces preparatory to welding.

Another object is to provide a consumable solid welding insert ring as described which is preformed to have substantially the configuration of the root faces and substantially uniform thickness.

Another object is to provide a consumable solid welding insert ring as described which has the shape of a ring and has substantially uniform thickness.

Another object is to provide a consumable solid insert welding ring in which the inside-to-outside diameter width of the ring faces which lie against the root faces exceeds the corresponding width of the root faces.

The best modes in which it has been contemplated applying the principles of the present invention are shown in the accompanying drawings but the latter are to be deemed merely illustrative because it is intended that patent shall cover by suitable expression in the appended claims whatever features of patentable novelty exist in the invention disclosed.

Figure 4:
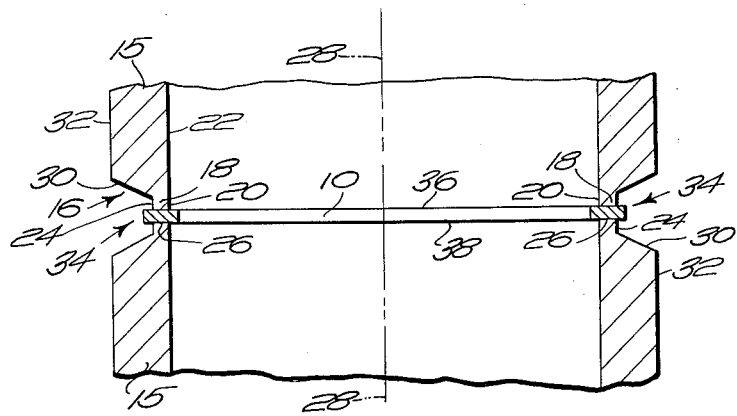
FIGURE 4 is a cross-sectional elevation view of a pipe joint to be welded in which the root faces lie in substantially horizontal planes showing the insert ring of FIG. 1 located between these root faces.

Referring now more particularly to the drawings, one form of the consumable insert welding material of the present invention is a solid ring 10 having an outside diameter 12 and an inside diameter 14. In the fit-up of a pipe joint in which this ring is to be used, the adjacent ends of the pipe sections 15 are first prepared by having portions of these ends cut away as at 16 (FIGURE 4). A variety of cutaway configurations are currently in use with which the improved form of insert welding material of the present invention may be employed. Each of these cutaways involves the removal of material of the pipe at the end thereof diametrically inward from the exterior pipe surface part way through the wall thickness to leave a lip or root 18, as it is called, extending longitudinally of the pipe section with its interior side 20 formed by the interior pipe wall surface 22. The exterior root side 24 extends generally parallel to the interior root side 20 and the root end or face 26 defined by the interior and exterior root sides lies in a plane substantially perpendicular to the pipe section's longitudinal axis 28. From the inner end of the exterior root surface 24 the surface of the cutaway extends outward as at 30 to the exterior pipe section surface 32.

This cutaway 16 is normally achieved by a machining operation, and when the root faces 26 of two pipe sections thus machined are brought into contact with each other with the longitudinal axes 28 of the pipe sections aligned the two cutaway sections 16 combine to form a groove 34 with its bottom surface defined by the exterior surfaces 24 of the roots 18.

The consumable insert ring 10 is inserted between the root faces 26 so that these root faces engage the opposite ring sides 36 and 38.

While it is within the scope of the present invention to so form the insert welding ring 10 that when it is centered between the root faces 26 the inner and outer ring edges 40 and 42, respectively, are flush with the interior and exterior root surfaces 20 and 24, respectively, it is preferred that the ring be wider than the root faces, for example with the inside ring diameter 14 somewhat smaller than the inside diameter of the pipe section and with the outside ring diameter 12 somewhat greater than the outside diameter of the root face 26. The reason for this is that by having excess ring material either extending outward into the groove 34 or into the pipe interior or both there is an excess of fusable ring material at the joint during the welding of the root pass. This excess of material increases the cross-sectional area of the root pass at the fused portion thereof and decreases the likelihood of microcracking in the root pass due to cooling stresses exceeding the strength provided by a small area of fused material. Furthermore, this slight excess of fusable material serves to prevent microcracking in cases where small gaps between the ring sides 36 and 38 and root faces 26 are desired, where the fit-up is poor because the longitudinal axes 28 of the pipe sections are not properly aligned, or where improper machining of the root faces 26 prevents them from making full and continuous contact with the ring sides 36 and 38 when no gaps are desired.

Where the pipe sections to be welded are so disposed in space that the root faces lie in horizontal planes or in planes which are not substantially tilted from the horizontal so that in the fit-up the ring of the present invention may be rested in its proper location on the root face of the lowermost pipe section and will remain there while the uppermost pipe section is brought down upon it, it is not necessary to provide structure on the ring for positively locating the ring concentrically with respect to the root faces. With proper care the ring may be suitably located until it is engaged on both of its sides 36 and 38 by the root face 26, whereupon the weight of the uppermost pipe section exerted downward on the ring will hold the ring firmly in place and prevent ring displacement during the welding operation.

However, even where the pipe sections to be welded are thus disposed in space with their respective root faces in substantially horizontal planes, it is frequently desirable to provide means which enable the location of the ring in its proper position with a minimum of care and which positively hold the ring in such position during the fit-up. When the ring can be so located and held the degree of care required to place the ring on the lowermost root surface 26 and to bring the uppermost root surface into engagement therewith is considerably less and expensive fit-up time is saved.

Figures 5, 7:
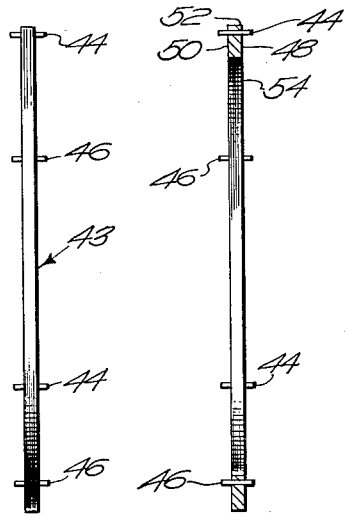
FIGURE 5 is an end elevation view of a modification of the insert ring of FIG. 1 showing aligning pins inserted through the ring at various points adjacent to the inner and outer edges thereof.
FIGURE 7 is a cross-sectional end elevation view of the ring of FIG. 5 taken as on line 7—7 of FIG. 6.
Figure 6:
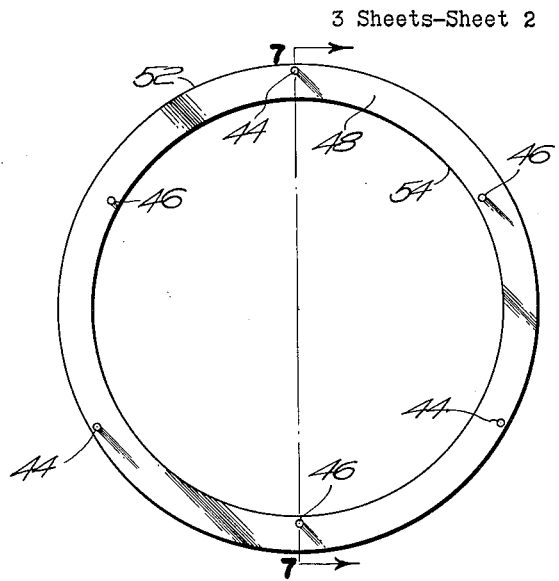
FIGURE 6 is a side elevation view of the ring of FIG. 5.

FIGS. 5 to 7 of the drawings illustrate structure associated with the ring for enabling the achievement of quick and positive ring location. The ring 43 shown in these figures is like the ring 10 of FIGS. 1 to 3 except that pins 44 and 46 are passed through the ring with their ends extending a short distance outward from the ring sides of 48 and 50 at substantially right angles thereto. Each of these pins is firmly held in the ring as for example by being pressed into a hole in the ring 43.

The pins 44 are located near the outside edge 52 of the ring 43 so that each will overlie the exterior root surface 24 when the ring is located between the root faces 26. Similarly, the pins 46 are located near the inner edge 54 of the ring 43 so that each will overlie the interior root surface 20 when the ring is in position. It will be understood that while FIGS. 5 to 7 show a ring having both "outside" pins 44 and "inside" pins 46, proper location of the ring between the root surfaces may be achieved by the use of only a suitable number of "outside" pins 44 or by the use of only a suitable number of the "inside" pins 46 and either of these arrangements is within the scope of this invention.

Where pins such as those shown in FIGS. 5 to 8 are employed, it is preferred that they be of a material which is the same as, or similar to, that of the material of the ring itself and that particularly where they are located as "inside" pins 46 they be relatively small so that they will not result in substantial enlargement of the interior welding bead of the root pass.

Figures 9, 11:
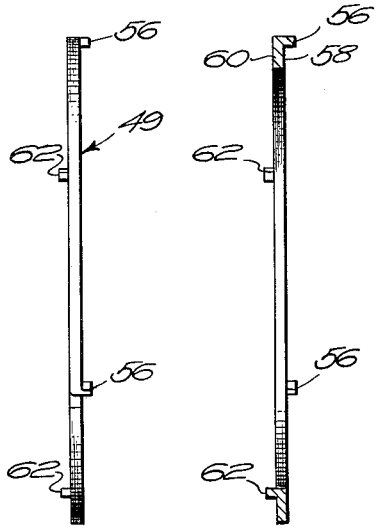
FIGURE 9 is an end elevation view of another modification of the insert ring of the present invention showing cutouts made at various places into the outside edge of the ring and bent out at right angles to the sides of the ring to serve as supporting and locating means.
FIGURE 11 is a cross-sectional end elevation view of the ring of FIG. 9 taken as on line 11—11 of FIG. 10.
Figure 10:
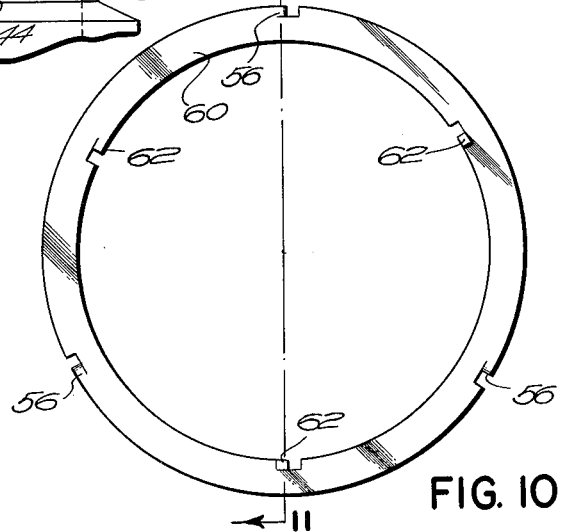
FIGURE 10 is a side elevation view of the ring of FIG. 9.

FIGURES 9 to 11 of the drawing show another embodiment of the improved consumable insert welding ring of the present invention which is capable of quick and positive location between the root faces 26 during fit-up. Instead of the pins 44 and 46, cutouts 56 are provided in the portion of the ring 49 which extends outward beyond the exterior root surfaces 24 and are bent at substantially right angles to the ring sides 58 and 60. Similarly cutouts 62 are provided in the portion of the ring 49 which extends inward beyond the interior root surfaces 20 and are bent in like fashion. These bent cutouts 56 and 62 extend a short distance outward from the ring sides to overlie, in the case of the cutouts 56, the exterior root surfaces 24 and, in the case of the cutouts 62, the interior root surfaces 20. As in the case of the embodiment of the ring shown in FIGS. 5 to 7, wherein pins 44 and 46 are employed, it is not necessary in the embodiment of FIGS. 9 to 11 to provide both the "outside" cutouts 56 and the "inside" cutouts 62. Proper positive location of the ring on the root faces 26 can be achieved with either a suitable number of "outside" cutouts 56 or a suitable number of "inside" cutouts 62.

Figures 12, 14:
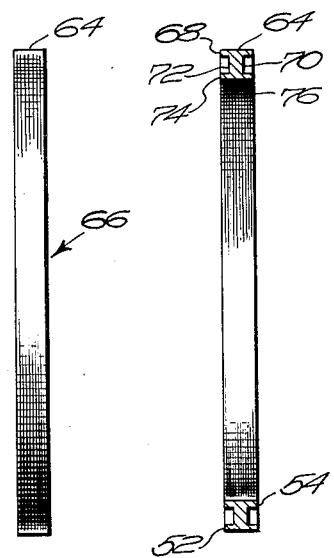
FIGURE 12 is still another embodiment of the insert welding ring of the present invention showing continuous flanges formed on both surfaces of the ring at the inner and outer edges thereof extending at right angles to these surfaces.
FIGURE 14 is a cross-sectional end elevation view of the ring of FIG. 12 taken as on line 14—14 of FIG. 13.
Figure 13:
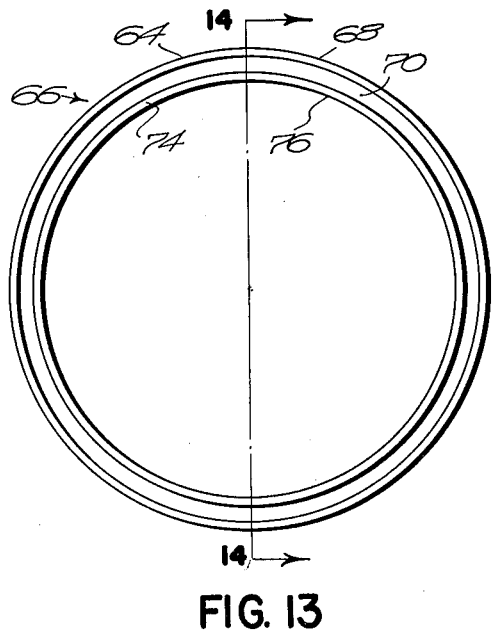
FIGURE 13 is a side elevation view of the ring of FIG. 12.

Another modification of the consumable insert welding ring of the present invention is illustrated in FIGS. 12 to 14 wherein there is provided at the outer edge 64 of a ring 66 a flange 68 extending short distances from the ring sides 70 and 72 at substantially right angles thereto, the outside surface of the flange being coincidental with this outside ring edge 64. Also shown in this embodiment is a second flange 74 similarly extending short distances from the ring sides 70 and 72 at substantially right angles thereto, the inside surface of this flange being coincidental with the inside ring edge 76.

Whereas the embodiment of FIGS. 9 to 11 can be distinguished from the embodiment of FIGS. 5 to 7 in that the bent cutouts 56 and 62 for positively locating the ring on the root faces are integral with the ring itself rather than separate pins, the embodiment of FIGS. 12 to 14 may be distinguished from the embodiment of FIGS. 9 to 11 in that in the former the flanges 68 and 74 are continuous around the ring in addition to being integral therewith. A continuous though non-integral locating flange or flanges may be employed in like manner.

Figure 15:
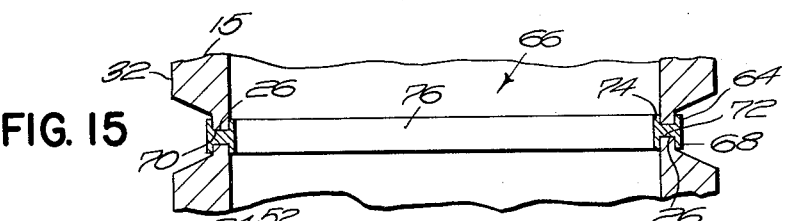
FIGURE 15 is a cross-sectional elevation view of a pipe joint fit-up having root faces which lie in horizontal planes and showing the FIGS. 12 to 14 modification of the ring inserted between these root faces.

FIGURE 15 illustrates the manner in which a ring 66 provided with flanges 68 and 74 is positioned between the root faces 26 of pipe sections preparatory to the welding of the root pass. Although the ring shown in FIGS. 12 to 15 is provided with both outside and inside flanges 68 and 74, respectively, it will be apparent that either one of these flanges alone will serve to provide positive location of the ring in its proper position between the root faces 26.

Figures 1, 3:
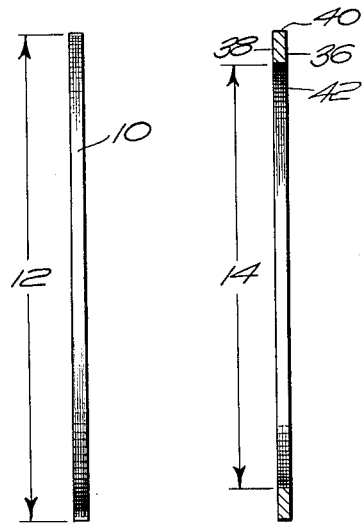
FIGURE 1 is an end elevation view of one embodiment of the consumable solid insert welding ring of the present invention.
FIGURE 3 is a cross-sectional view of the ring of FIG. 1 taken as on line 3—3 of FIG. 2.
Figure 2:
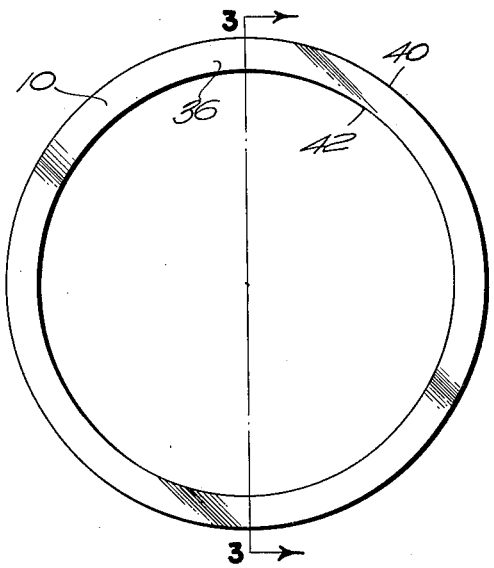
FIGURE 2 is a side elevation view of the ring of FIG. 1.
Figure 16:
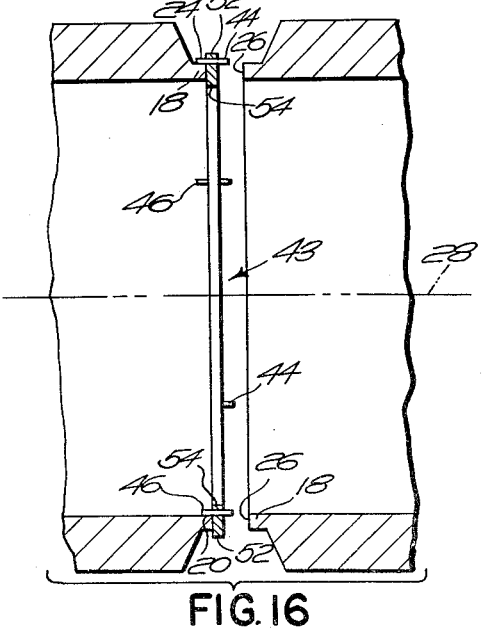
FIGURE 16 is a cross-sectional side elevation view of the adjacent ends of two horizontally disposed pipe sections which are aligned but slightly separated showing the ring modification of FIGS. 5 to 7 supported on one of the roots across the face thereof.

While the positive locating structure associated with the rings of FIGS. 1, 5, and 12 are very desirable for quickly and positively locating the ring between subtsantially horizontal root faces, it will be appreciated that where the root faces are substantially tilted from the horizontal such locating means extending substantially perpendicular to the ring sides are essential to support the ring in its proper position during fit-up and root pass welding. FIG. 16 illustrates how the embodiment of the ring 43 of FIGS. 5 to 7 is not only located in proper position with respect to the root face 26 of one of the horizontal pipe sections, but is also actually supported across this face by the pins 44 and 46. The portion of the uppermost pin 44 which overlies the exterior root surface 24 at the uppermost side of the pipe section serves to support the ring against the force of gravity, and similarly the extending portion of the inside pin 46 which overlies the interior root surface 20 at the lowermost side of the pipe section contributes to this support. Though not apparent from this FIG. 16, it will be understood that any outside pins 44 which are located in the ring above the center line 28 of the pipe will contribute to the support of the ring, and in like manner any inside pins 46 which are located below the center line of the pipe will provide support in the manner described. Inasmuch as any one of the pins 44 or 46 is of sufficient strength to support the entire ring against the force of gravity a single pin as for example the uppermost pin 44, would be all that would be necessary to discharge the supporting function, additional pins merely being useful to discharge the positive locating function previously described. The bent cutouts of the embodiment of FIGS. 9 to 11 and the flanges of the FIGS. 12 to 14 are equally well suited to discharge the supporting function in addition to the locating function.

Upon the application of the welding heat to the roots 18 and to the insert welding ring therebetween the fused metal of the roots and of the ring achieves sufficient viscosity before cooling to flow under the influence of gravity. In the case where the pipe sections were so disposed in space that the root faces 26 are substantially horizontal this tendency of the molten weld metal to flow, though it may influence the shape of the interior and exterior welding beads very slightly, does not result in any substantial movement of the fused metal from its initial location prior to becoming fused. Where, however, the pipe sections to be welded are so disposed in space that the adjacent root faces 26 lie in planes which are vertical or substantially tilted from the horizontal, this tendency of the fused weld metal to flow downward has resulted in the movement, prior to cooling, of a considerable amount of the fused material down into the pipe interior at the top of the weld, and, conversely, has resulted in the movement of a similar amount of fused material to a point substantially below the interior pipe surface 22 at the bottom of the weld.

This weld metal "sag," as it is called, presents a serious problem in cases where the interior surface of the piping system must be as smooth as possible, a condition required in the piping systems of many chemical processes where the pipe lines are periodically cleaned out by scraping or where local accumulations of matter on interior pipe line irregularities would result in plugging or excessive corrosion. In isolated instances it is possible to avoid this problem of weld metal sag by application of the source of heat to the roots only at the side of the piping sections and by rotating the piping sections themselves, keeping the heat source fixed.

Although the insert welding rings of this invention may be used to advantage in the root pass welding of pipe and tubing of a variety of compositions, the development of these rings was directed primarily toward the solving of the serious problem of microcracking in the root pass weld where the piping or tubing material is stainless steel. For example, these microcracking difficulties have been very marked in the welding of the columbium-stabilized type 347 grade stainless steel (American Society for Testing Materials and American Iron and Steel Institute designation) which is a material now being widely used in power and chemical process piping where the operating temperatures, pressures and corrosive service conditions require the use of high quality stainless steel. A typical chemical composition for this type 347 stainless steel pipe is as follows:

|  | Percent |
|---|---|
| Carbon | 0.08 |
| Manganese | 1.54 |
| Silicon | 0.51 |
| Chromium | 17.64 |
| Nickel | 11.70 |
| Molybdenum | 0.36 |
| Columbium | 0.87 |
| Iron | 67.30 |

Such a composition is essentially a fully austenitic structure which is found to be particularly crack sensitive when welded. The tendency of this material to crak during welding is greatly reduced by the use of the solid insert rings as herein described when they are of the same composition as the piping material itself, but the tendency of this fully austenitic pipe material to crack is even further reduced when the insert welding ring material is of a composition slightly different than that of the pipe itself. Thus, for example, with a fully austenitic structure in the pipe material it is frequently preferred that the ring material be one which when mixed with the pipe material in the welding operation results in a fused weld metal having a partially ferritic structure. An example of such a ring structure has the following chemical composition:

|  | Percent |
|---|---|
| Carbon | 0.08 |
| Manganese | 1.62 |
| Silicon | 0.43 |
| Chromium | 20.60 |
| Nickel | 8.80 |
| Molybdenum | 0.31 |
| Columbium | 0.71 |
| Iron | 67.45 |

According to the Schaeffler diagram (Metal Progress, vol. 56, p. 680, 1949) this welding ring composition is likely to contain a ferrite content of approximately 10% the balance being essentially austenite. During welding of the root pass the heat will melt the insert ring metal and part of the root metal and cause moving of these metals. The resulting mixed weld metal contains approximately 50% of the root metal and 50% of insert ring metal. In the experiments with the above stated pipe material (type 347 grade, fully austenitic) and insert ring material (10% ferritic) the deposit contained approximately 3% ferrite as checked by magnetic measurements. Microcracking was eliminated as was demonstrated by actual weld tests.

In commercial applications good results have been obtained with the insert rings of the present invention using various commercial grades of stainless steel piping, as for example, types 304, 310, 312, 316, 321, and 347 stainless steels (ASTM & AISI designations), and similarly good results have been obtained on nickel and Monel piping. Except in the cases where the composition of the pipe material is particularly crack sensitive, as in the case of the type 347 austenitic stainless steel described, the insert ring metal is normally the same as that of the pipe metal.

The following percentage ranges for the elements in the insert ring metal preferred in welding type 347 stainless steel when the latter is fully austenitic:

| | |
|---|---|
| Carbon | up to 0.08% max. |
| Manganese | 1.50–2.50%. |
| Silicon | 0.25–0.75%. |
| Chromium | 20.0–21.5%. |
| Nickel | 8.5–10.0%. |
| Columbium | 0.50–0.80%. |
| Iron | Balance. |

The type 347 grade stainless steel often has a composition rendering it partially ferritic. The following table illustrates the preferred percentage ranges of the elements in the insert ring metal for use with piping of such partially ferritic type 347 grade:

| | |
|---|---|
| Carbon | 0.07–0.10%. |
| Manganese | 1.50–2.50%. |
| Silicon | up to 0.5%. |
| Chromium | 18.5–20.0%. |
| Nickel | 9.5–10.5%. |
| Columbium | 0.60–0.90%. |
| Iron | Balance. |

In certain high temperature environments where the partially ferritic welds cannot be tolerated and the fully austenitic structure must be maintained, special stabilized stainless steel compositions having large manganese content have been found satisfactory as insert ring compositions. An example of one such composition is the following:

| | Percent |
|---|---|
| Carbon | 0.09 |
| Manganese | 3.04 |
| Silicon | 0.56 |
| Chromium | 15.67 |
| Nickel | 11.78 |
| Columbium | 0.95 |
| Iron | 67.91 |

Figure 8:
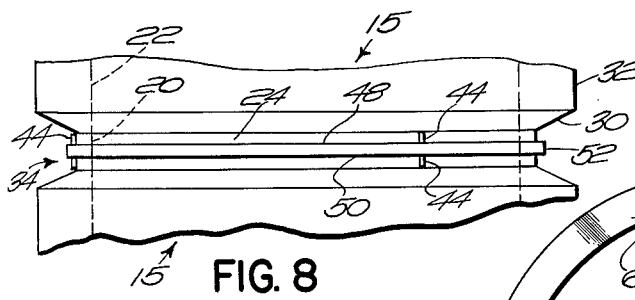
FIGURE 8 is an elevation view of a pipe joint fit-up preparatory to welding of the root pass with the root faces lying in horizontal planes and showing the insert ring of FIGS. 5 to 7 between the root faces.
Figure 8A:
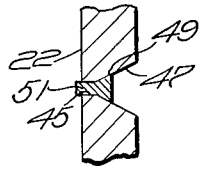
FIGURE 8a shows a modified form of root.

While in each of the embodiments above described I have shown but one form of root, it is to be understood that various other forms are within the contemplation of the present invention. FIGURE 8a shows one such modified form wherein the flat root faces 45 interconnect the inside surface 22 of the tubular element with an inclined surface 47 which in turn angularly merges with the outside surface 32 of the tubular element. The projecting means 49 carried by the welding insert ring 51 is shown as being complementary with the inclined surface 47 and may be either discontinuous or continuous throughout the length of the ring.

Moreover, although each of the weld insert rings shown is of the endless type, i.e., continuous without any breaks, it is within the contemplation of the present invention to utilize strips which are preformed by bending into rings with both ends of each strip being juxtaposed so as to provide a substantially continuous ring.

This application is a continuation of my prior application Serial No. 472,911, filed December 3, 1954 for Insert Welding Rings, now abandoned.

I claim:

1. An assembly for fabricating a butt welded pipe joint without a backing ring, said assembly including two pipe ends each having an extending root with the root inside diameter coextensive with the inside diameter of the pipe and the root outside diameter smaller than the outside diameter of the pipe and with a face at its end, said root faces spaced apart and presented toward each other in parallel relation, a completely consumable separate and independent metal insert ring mounted between and engaging said root faces to be freely movable in a plane parallel to said root faces and of a composition having a melting point substantially equal to that of the adjacent roots, said ring being a continuous circle of a flat edgewise circularly curved strip of rectangular cross-section with a width measured along a radius of said ring at least equal to the difference between the inside and outside diameters of an adjacent root face but less than the difference between the inside and outside diameters of an adjacent pipe, whereby when said ring and said roots are subjected to a sufficiently high predetermined temperature, the metal of said ring will completely and totally fuse with the metal of said roots.

2. An assembly for fabricating a butt welded pipe joint without a backing ring, said assembly including two pipe ends each having an extending root with the root inside diameter coextensive with the inside diameter of the pipe and the root outside diameter smaller than the outside diameter of the pipe and with a face at its end, said root faces being spaced apart and presented toward each other in parallel relation, a completely consumable separate and independent metal insert welding ring mounted between and engaging said root faces to be freely movable in a plane parallel to said root faces and of a composition having a melting point substantially equal to that of the adjacent roots, said ring being a continuous circle of a flat edgewise circularly curved strip of rectangular cross-section with a width measured along a radius of said ring greater than the difference between the inside and outside diameters of an adjacent root face but less than the difference between the inside and outside diameters of an adjacent pipe, whereby when said ring and said roots are subjected to a sufficiently high predetermined temperature, the metal of said ring will completely and totally fuse with the metal of said roots.

3. An assembly for fabricating a butt welded pipe joint without a backing ring, said assembly including two pipe ends each having an extending root with the root inside diameter coextensive with the inside diameter of the pipe and the root outside diameter smaller than the outside diameter of the pipe and with a face at its end, said root faces being spaced apart and presented toward each other in parallel relation, a completely consumable separate and independent metal insert welding ring mounted between and engaging said root faces to be freely movable in a plane parallel to said root faces and of a composition having a melting point substantially equal to that of the adjacent roots, said ring being a continuous circle of a flat edgewise circularly curved strip of rectangular cross-section with a width measured along a radius of said ring such that the inside diameter of the ring is at most equal to any overall inside diameter of the adjoining root faces and the outside diameter of the ring is at least equal to any overall outside diameter of the adjoining root faces but less than the outside diameter of the adjoining pipes, whereby when said ring and said roots are subjected to a sufficiently high predetermined temperature, the metal of said ring will completely and totally fuse with the metal of said roots.

4. An assembly for fabricating a butt welded pipe joint without a backing ring, said assembly including two pipe ends each having an extending root with the root inside diameter coextensive with the inside diameter of the pipe and the root outside diameter smaller than the outside diameter of the pipe and with a face at its end, said root faces being spaced apart and presented toward each other in parallel relation, a completely consumable separate and independent metal insert ring mounted between and engaging said root faces to be freely movable in a plane parallel to said root faces and of a composition having a melting point substantially equal to that of the adjacent roots, said ring being a continuous circle of a flat edgewise circularly curved strip of rectangular cross-section with a width measured along a radius of said ring such that the inside diameter of the ring is smaller than any overall inside diameter of the adjoining root faces and the outside diameter of the ring is greater than any overall outside diameter of the adjoining root faces but less than any overall outside diameter of the adjoining pipes, whereby when said ring and said roots are subjected to a sufficiently high predetermined temperature, the metal of said ring will completely and totally fuse with the metal of said roots.

References Cited in the file of this patent

UNITED STATES PATENTS

| | | |
|---|---|---|
| 1,313,387 | Kaarbo | Aug. 19, 1919 |
| 1,630,037 | Stresau | May 24, 1927 |
| 1,935,063 | Scott | Nov. 14, 1933 |
| 1,980,561 | Wagner | Nov. 13, 1934 |
| 2,028,233 | Naeder | Jan. 21, 1936 |
| 2,146,901 | Lane | Feb. 14, 1939 |
| 2,151,334 | Rockefeller | Mar. 21, 1939 |
| 2,191,343 | Doran | Feb. 20, 1940 |
| 2,297,554 | Hardy et al. | Sept. 29, 1942 |
| 2,369,381 | Unke | Feb. 13, 1945 |
| 2,372,712 | Crawford | Apr. 3, 1945 |
| 2,424,522 | Wasserman | July 22, 1947 |
| 2,646,995 | Thompson | July 28, 1953 |
| 2,792,490 | Risch et al. | May 14, 1957 |